United States Patent [19]

Cartwright et al.

[11] E Re. 30,913

[45] Reissued Apr. 27, 1982

[54] SAFETY RAZOR WITH FLEXIBLE BLADE CARTRIDGE

[75] Inventors: Cyril A. Cartwright, Monroe; James S. Emmett, Ansonia; Arthur E. Michael, Middletown; Anthony J. Peleckis, Fairfield; Ernest M. Symes, Guilford, all of Conn.

[73] Assignee: Warner-Lambert Company, Morris Plains, N.J.

[21] Appl. No.: 112,757

[22] Filed: Jan. 17, 1980

Related U.S. Patent Documents

Reissue of:

[64] Patent No.: 4,069,580
Issued: Jan. 24, 1978
Appl. No.: 715,272
Filed: Aug. 18, 1976

[51] Int. Cl.[3] ..... B26B 21/14

[52] U.S. Cl. ..... 30/47; 30/32; 30/50; 30/346.58

[58] Field of Search ..... 30/32, 40.1, 47, 50, 30/49, 77-81, 83, 345, 346.57, 346.58, 346.59

[56] References Cited

U.S. PATENT DOCUMENTS

| | | | |
|---|---|---|---|
| 1,383,783 | 7/1921 | Billingsley | 30/32 X |
| 1,932,110 | 10/1933 | Koree | 30/49 |
| 2,521,481 | 9/1950 | Rodriques | 30/83 |
| 3,262,206 | 7/1966 | Tomek | 30/50 X |
| 3,500,539 | 3/1970 | Muros | 30/40.1 |
| 3,583,262 | 6/1971 | Mullen | 30/32 X |
| 3,587,171 | 6/1971 | Perry | 30/40.1 |
| 3,777,396 | 12/1973 | Simonetti | 30/50 X |
| 3,832,774 | 9/1974 | Perry | 30/47 X |

*Primary Examiner*—Gary L. Smith
*Attorney, Agent, or Firm*—R. S. Strickler

[57] ABSTRACT

A razor blade assembly which is flexible in at least one bending mode. A seat member of substantially planar shape has an integrally formed guard located transversely along its forward margin. The guard and seat members are formed of a flexible material. A flexible blade having a sharpened edge along a transverse margin is disposed on a surface of the seat member having its edge parallel to and rearwardly located of the guard bar. A cap member of flexible material has a planar surface in contact with the blade and a front margin located rearwardly of the cutting edge. The seat, blade and cap are yieldingly bonded together and freely flexible about an axis parallel to the plane of the blade and perpendicular to the cutting edge.

30 Claims, 7 Drawing Figures

SAFETY RAZOR WITH FLEXIBLE BLADE CARTRIDGE

Matter enclosed in heavy brackets [ ] appears in the original patent but forms no part of this reissue specification; matter printed in italics indicates the additions made by reissue.

BACKGROUND OF THE INVENTION

This invention is directed to a novel safety razor construction and more particularly directed to a flexible razor blade assembly.

Since the introduction of the safety razor, the blade assembly has consisted principally of three members, namely, a handle, a guard bar and seat combination, and a cap. The function of the guard bar/seat and cap is to properly locate and hold the blade in the proper location for cutting hair in controlled contact with the skin. Generally these elements have been manufactured as separate components which, when removably attached or fixedly attached to the handle, combine to maintain desired geometry in relationship of these elements during the act of shaving.

Of more recent development is the bonded cartridge or razor blade assembly in which the seat, cap and blade are permanently and rigidly bonded together to achieve and maintain a desired shaving geometry and fixed relationship of the parts. In this arrangement, the cartridge is adapted to be coupled as a complete and unitary assembly to the handle. This type of configuration is exemplified and disclosed in U.S. Pat. No. 3,783,510, which employs a tandem or twin blade assembly with a spacer therebetween permanently and rigidly bonded to a cap and platform member, the platform member or seat having an integral guard bar and coupling members for attachment to the handle.

The advantage of the bonded cartridge is mainly one of convenience. It achieves no more than prior art shaving systems previously described, i.e., discrete components assembled to the razor handle, but it does provide some ease of handling with a concomitant increase in price.

There have been attempts to alter the operation and geometrical relationships of the blade assembly to achieve increased shaving comfort and efficiency. U.S. Pat. No. 1,383,783 describes a shaving system having a number of parallel arrayed blades fixed to a flexible support or platform, the purpose of the flexible support being to provide or enable the razor to adapt itself to contours of the face while being moved thereover. The platform of this prior art device is flexible about an axis parallel to the plane of the blades and to the edges thereof; hence such structure fails to permit the blade itself to conform to facial or body contours.

Another attempt to fashion a blade assembly adaptable to user requirements is described in U.S. Pat. No. 3,500,539. The device described therein utilizes a transversely arrayed guard bar connected to the blade platform by a yieldable web structure. Dependent upon the applied shaving force, the orientation of the guard with respect to the blade edge is altered resulting in changing blade exposure, blade tangent angle, and shaving angle. These terms are defined as follows: The blade exposure is the normal distance the blade edge extends above or below a plane tangent to the cap and guard bar; the blade tangent angle is the angle formed between a plane tangent to the blade edge and the guard bar and a second plane bisecting the blade edge; the shaving angle is the angle formed between the plane bisecting the blade edge and the plane tangent to the cap and guard bar. Theoretically, this type of arrangement might permit a shaver to select desired geometry by the application of a controlled force. However, in practical application, the achieving of the desired geometry in this fashion has proven difficult. It is further pointed out that the structure of this patent fails to provide for adaptability to the contours of the shaver's face or body.

Applicants have realized the desirability of a shaving system which would maintain uniform, consistent geometry when in use but which would also allow the blade to substantially conform to the contours of the skin surface in order to achieve greater comfort, safety and efficiency. Such a system would allow selection of optimum shaving geometry and, if given sufficient flexibility, would permit the maintenance of optimum geometry while the system was conforming to varying contours. Flexing of the assembly may be derived through mechanical or structural changes of the blade assembly or through the utilization of materials which allow the cap and seat to yieldingly follow changing contours. In using a device of this nature, the cutting edge is allowed to stay in contact with a maximum amount of skin surface despite undulations therein, which a non-flexible system might only achieve when shaving a surface parallel to the blade edge. Obviously, the latter surface is unavailable on the human body.

The intent of this invention is to define and provide a system which maintains uniform and consistent shaving geometry while substantially conforming to the contours of the skin surface. Another object of the invention is to provide a flexible razor blade assembly wherein the cutting edge is maintained in optimum contact with the skin surface. Yet another object of the invention is to provide a unitary bonded flexible shaving cartridge having at least one razor blade therein. Yet another object of the present invention is to provide a flexible cartridge in which the components thereof are yieldingly bonded together.

SUMMARY OF THE INVENTION

The foregoing disadvantages of prior art systems and the objects of the invention are satisfied and achieved by the present invention which contemplates a blade assembly in which a seat member and a blade disposed thereon are flexible about an axis parallel to the plane of the blade and perpendicular to its cutting edge.

Another aspect of the present invention contemplates a seat member having a substantially planar surface and an integral platform formed transversely along a forward margin, the guard and seat members being formed of a flexible material. A flexible blade having a sharpened edge along a transverse margin is disposed on the seat member in contact with the planar surface with its edge parallel to and rearwardly located of the guard bar. A cap member of flexible material has a planar surface in contact with the blade surface and a front margin located rearwardly of the cutting edge, the seat member, guard member, blade, and cap being yieldingly bonded together and flexible about an axis parallel to the plane and perpendicular to the cutting edge. In another aspect of the invention, cap and seat members are bonded together with a blade interposed therebetween, the assembly being flexible about an axis parallel to the plane of the blade and perpendicular to the cutting edge and wherein the shaving angle and blade tangent angle and exposure remain substantially constant during flexure of the assembly.

Another aspect of the invention contemplates seat, guard bar and cap members molded from a flexible polymer or other flexible material and in which the seat member has a plurality of ribs in parallel array perpendicular to its forward margin, the ribs being interconnected by flexible webbing, thereby permitting flexure of the assembly about an axis parallel to the plane of the blade and perpendicular to the cutting edge.

The objects and features of the present invention will be apparent upon consideration of the detail and specification hereafter set forth taken in conjunction with the drawings. The drawings are intended to be exemplary of the invention and standard symbols are used with consistent numbering throughout the different views.

DESCRIPTION OF THE PREFERRED EMBODIMENT

Figure 1:
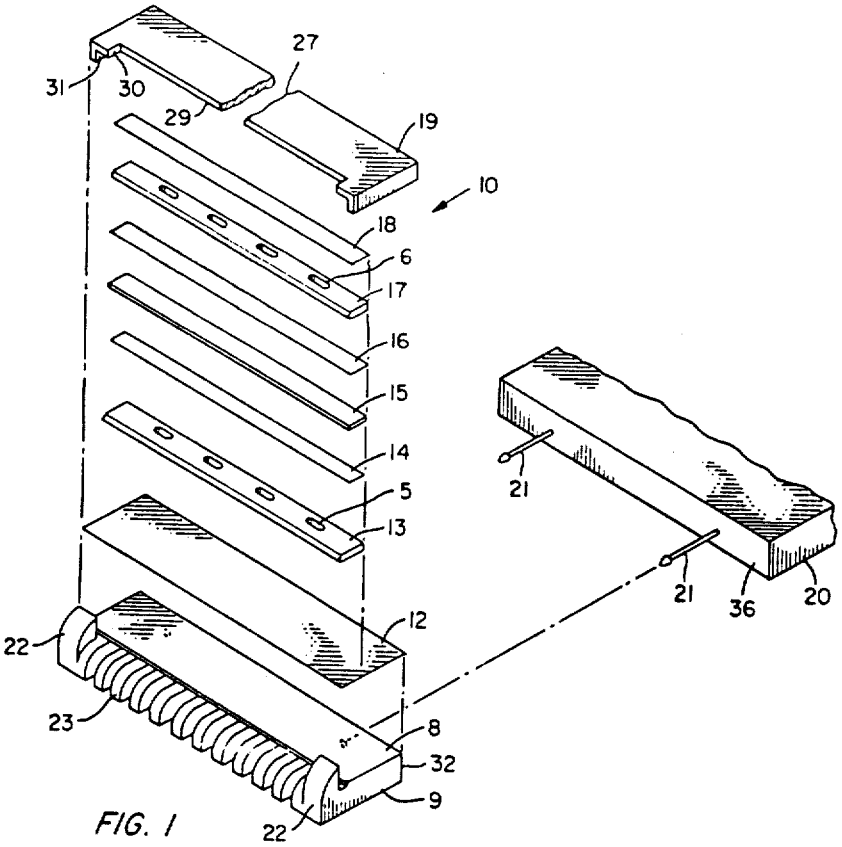
FIG. 1 is an exploded fragmentary view of a twin blade cartridge and razor handle made in conformity with the present invention.

Referring to FIG. 1, there is shown a razor blade assembly 10 made in conformance with the present invention. A flexible seat member 11 having an integral guard bar 23 is assembled to an adhesive strip 12, a first blade 13, a second adhesive strip 14, a spacer member 15, a third adhesive strip 16, a second blade 17, a fourth adhesive strip 18, and finally a cap member 19. When brought together under suitable compressive forces, the assembly comprises a bonded twin blade cartridge flexible about an axis parallel to the plane of the blades and perpendicular to their edges. A head member 20 of a shaving handle (not shown) connects to seat 11 by means of linkage pins 21. When head 20 is coupled to seat 11, face 32 engages face 36.

Figure 2:
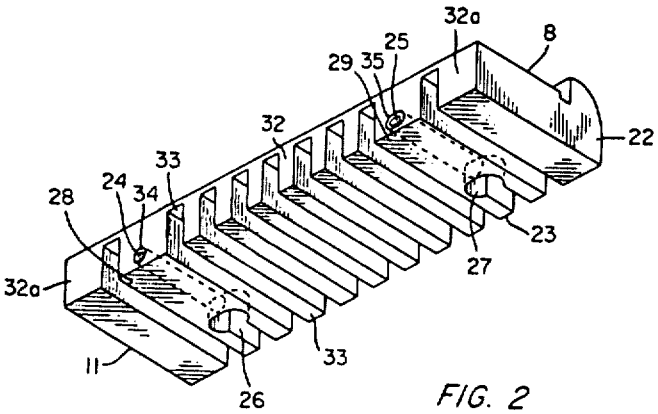
FIG. 2 is a perspective view of the blade seat of FIG. 1.

Referring also to FIG. 2, seat 11 includes an upper planar surface 8, a rear margin or face 32 and side margins 9. Comb guard bar member 23 is transversely arrayed along the front margin of seat 11 having raised portions or members 22 located at each end thereof to protect the user from coming in contact with blade corners. Seat 11 is formed by a series of parallel arrayed ribs 33 running transversely along its entire length and arranged perpendicular to its front margin. End ribs 32a are of greater cross-section than ribs 33 to lend structural integrity and cross-axis stiffness to the assembly. Ribs 32a found at either end of seat 11 are integrally formed with and terminate in end members 22. Also formed of greater cross-section than ribs 33 are ribs 28 and 29 containing channels 24 and 25 into which pins 21 of head 20 are inserted.

Channel 24 is circular in cross-section extending from margin 32 to a point rearward of the front margin. Channel 24 opens into an enlarged plenum 26 from which point on rib 28 is bifurcated forming two ribs having substantially the same cross-sectional dimension as ribs 33. When one of linkage pins 21 is inserted through channel 24, its expanded head is received in plenum 26, thereby allowing free rotation of pin 21 in channel 24, the dimensions of which are controlled accordingly. The enlarged head of pin 21 restricts extraction from channel 24. Channel 25 opening into plenum 27 is substantially similar to channel 24 and plenum 26 except for its elliptical cross-sectional geometry. The ellipsoidal shape is selected so as to permit translational movement of pin 21 in channel 25 during flexure of seat 11. It can be appreciated that if seat 11 where flexed to conform to some given geometry the circumferential length of the arc segment located between the axes of channels 24 and 25 would need increase, such increase being compensated for by translational movement of pin 21 in channel 25.

A preferred construction of seat 11 finds a web thickness of approximately 0.014 to 0.016 inch as providing optimal flexibility although this dimension may vary from approximately 0.010 to 0.030 inch without seriously diminishing performance. It has been further found that the tooth width of comb guard bar 23 is preferably approximately 50% of the pitch increment, i.e., half the dimension from one face of the tooth to the same face of the next tooth, although again this dimension may be varied from about 25% to 75% of the pitch increment without seriously affecting performance. The pitch increment itself is preferably approximately 0.124 to 0.126 inch, but may be varied between approximately 0.090 and 0.200 inch in practice of the invention. To achieve desired bending or flexure of cartridge 10, pivot linkage pins 21 and channels 24 and 25 may be spaced apart a distance equaling approximately 50% of the transverse length of seat 11. In a typical cartridge 10 design, this distance may vary and, for example, in a cartridge having a transverse length of 1.6 inches the center-to-center spacing of channels 24, 25 may be approximately 0.976 inch. A decrease in pivot pins 21 center-to-center spacing generally favors or decreases the forces necessary in producing convex deflection while an increase in center-to-center spacing produces the converse. In some applications it has been found advantageous to place the pins in end ribs 32a to provide minimum concave flexure force. With regard to deflection forces, lands 34 and 35 are placed about the entrance apertures of channels 24 and 25, respectively. The lands minimize the area contact between margin 32 and face 36 of holder 20. It should also be noted that cartridge 10 bending may be achieved through a number of pivot linkage designs, e.g., rotatable cams, compliant materials, etc.

Seat 11 is preferably injection molded of a flexible plastic material such as polyvinyl chloride, polyethylene, ethylene vinyl acetate, silicone, urethane and thermoplastic rubbers. A number of products presently on the market, for example, Firestone FPC-1376, Uniroyal TPR-1600E, B. F. Goodrich 83794 and Dupont Alathon 3175, represent suitable molding materials containing the foregoing generic polymers. In a functional sense, a suitable material may be considered to be a polymer having required flexibility and stiffness which is capable of being adapted to high production molding techniques. The flexibility of the material in cooperation with the structural design provides the necessary compliance to satisfy the demands of the present invention.

Adhesive strips 12, 14, 16 and 18 act to bond the components of the cartridge together. Suitable adhesives are acrylics, rubbers, silicones and various other synthetics. Examples of adhesive products now available which have been found suitable are Minnesota Mining & Manufacturing 415,463 Acrylic, NPE 901 Synthetic Rubber, and Dennison Silicone Rubber. Use of adhesives permits relative motion between each of the assembly elements during flexure of cartridge 10, thus reducing bending forces and permitting greater conformity to skin contours. The use of such a yieldingly bonded laminar structure allows bending of cartridge 10 with a minimum geometrical distortion while permitting the component parts to return to their normal positioning upon the release of applied force. A typical cartridge assembly requires a 9.1 gram shaving force to cause a 0.050 inch center deflection with respect to the normal plane of the top surface of cap 19. The adhesive strips are preferably about 0.002 inch thick, but may be substantially varied in such dimensions without deleterious effect upon the performance of the product.

After disposition of tape strip 12 on top surface 8 of seat 11, blade 13 having a sharpened edge along its front margin is aligned rearwardly of the front margin of seat 11 and yieldingly held in that position by strip 12. Perforations 5 are longitudinally arrayed along its transverse length, which perforations act to increase flexibility of blade 13 as well as being used during the edge grinding process. Changes in perforation dimensions and locations may be used to tailor blade 13 flexibility.

Adhesive strip 14 is then placed along the top surface of blade 13 in alignment with its rear margin. In the twin blade design shown in FIG. 1, a spacer member 15, again aligned with the rear margin of blade 13, is then bonded to strip 14. Spacer member 15 separates the blades to provide desirable twin blade shaving geometry. Spacer 15 is normally approximately 0.015 to 0.020 inch thick and is fabricated from a flexible material. Over spacer 15 is placed adhesive strip 16, blade 17 and adhesive strip 18, all aligned along their rear margins. Blade 17, as is the case in blade 13, has perforations 26 along its transverse length to increase flexibility thereof. The width of blade 17 is less than that of blade 13 so that its cutting edge lies rearwardly of the cutting edge of blade 13 and produces the aforementioned desired twin blade shaving geometry. Blades 13 and 17 are preferably approximately 0.0015 inch thick made of ferritic stainless steel commonly available for blade fabrication. It has been found that thicknesses ranging between 0.001 and 0.010 inch may be utilized but do not realize the same optimal results.

The last element of assembly 10 is cap 19, which is yieldingly held to cap blade 17 by adhesive strip 18 to prevent lifting of cap leading edge 29. Flange members 30 of end walls 31 of cap 19 act to cover the ends of the assembly. In viewing this completed assembly, it becomes obvious applicants have produced a twin blade cartridge yieldingly bonded together being flexible about an axis parallel to the planes of the blades 13 and 17 and perpendicular to their cutting edges.

Figure 3:
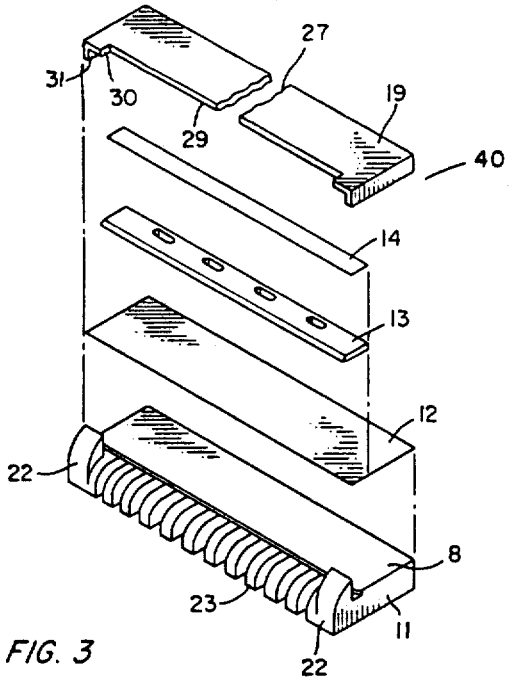
FIG. 3 is an exploded perspective view of a single blade cartridge made in accordance with the present invention.
Figure 4:
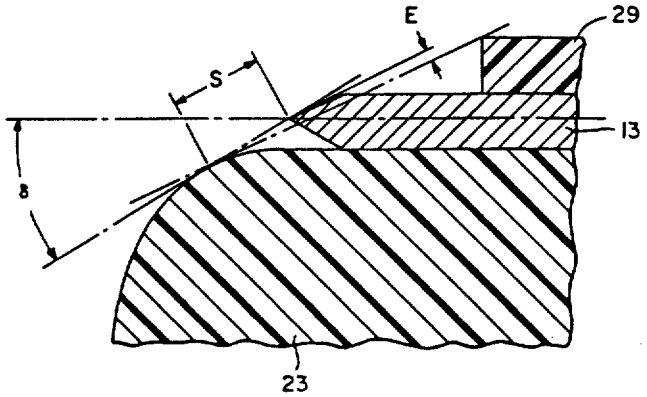
FIG. 4 is a schematic cross-sectional view of a blade assembly showing blade angle, tangent angle, and exposure.

A single blade construction conforming to the same functional requirements is shown in FIG. 3. Single blade cartridge 40 comprises seat member 11 having integral guard bar 23 and end projections 22 thereon. Adhesive strip 12 is disposed upon planar surface 8 after which blade 13, adhesive strip 14 and cap 19 are in sequence bonded thereto. The single blade cartridge 40 displays the same flexure or bending characteristics as cartridge 10 and produces a blade assembly capable of conforming to body contours while retaining substantially constant shaving geometry. Referring to FIG. 4, there is shown a schematic representation of single blade shaving geometry utilized in the construction of cartridge 40. The span S referring to the distance measured between the tip of blade 13 and a tangent point on comb guard 23 may be selected between approximately 0.030 and 0.080 inch; tangent angle Alpha may be selected between approximately 15° and 40°; and exposure E may be selected in a range between −0.010 and +0.006 inch.

This same geometry may also be reflected in the twin blade cartridge 10 design of FIG. 1 by applying the definitions to different reference elements. To explain—the geometry of first blade 13 falls within the same range as blade 13 of cartridge 40 if second blade 17 is considered the equivalent part to cap flange 29, i.e., the shaving angle plane is defined as a plane tangent to the edge of blade 17 and guard bar 23 rather than tangent to cap flange 29 and guard bar 23. Similarly, the same construction can be applied to second blade 17 in arriving at its shaving geometry by substituting the edge of blade 13 for the tangent line of guard 23. In a preferable embodiment based upon the foregoing premise, the geometry of blades 13 and 17 are selected to be substantially the same, namely, a span S of between 0.030 and 0.080 inch, a tangent angle Alpha of between 15° and 40°, and an exposure E between −0.010 and +0.006 inch but with the second blade tangent angle selected less than the first blade tangent angle. As the thicknesses of blades 13 and/or 17 are altered, the arrangement and dimensioning of the other elements of the cartridge must be altered to achieve the same or a different desired shaving geometry. It is these geometrical relationships that are maintained relatively constant while the cartridge of the present invention is being flexed through a range of different bending radii, both concave and convex. The preferred embodiments of both the twin and single blade cartridges have a tangent angle of approximately 20° to 24°, an exposure of approximately −0.004 to +0.002 inch, and a span of approximately 0.045 to 0.070 inch.

Figure 5:
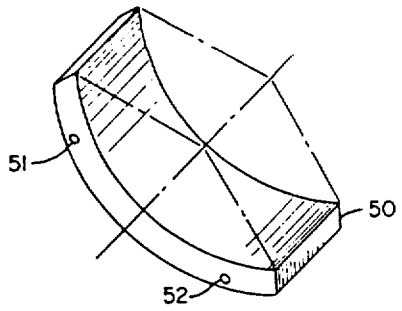
FIG. 5 is a schematic perspective view showing the cartridge in concave flexure.
Figure 6:
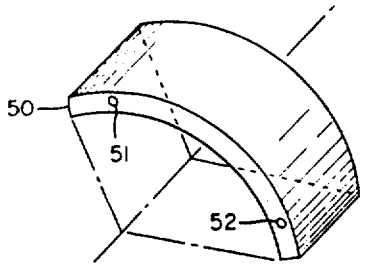
FIG. 6 is a schematic perspective view showing the cartridge in convex flexure.

Reference to FIGS. 5 and 6 demonstrates in a schematic sense the conformity of a bonded cartridge made in accordance with the present invention. In FIG. 5, cartridge 50, shown as an idealized flat rectangular prism, is conforming to a concavity in the shaving surface with cartridge 50 being moved toward the observer. Cartridge 50 assumes a complementary convex geometry with its center portion deflecting from a plane containing pivot points 51 and 52 with the entire surface assuming a given radius of curvature about axis 53. In FIG. 6, the same cartridge 50 is shown assuming a concave geometry about axis of curvature 54 conforming to a convexity in the shaving surface. As can be seen, the center of cartridge 50 deflects below the plane containing pivot pins 51 and 52 while the ends of cartridge 50 deflect above the same plane. It should be noted that the portions of the cartridge extending beyond pivot points 51 and 52 may assume a totally different radius of curvature from that occurring between the same pivot points.

Moreover, in conforming to undulations of the shaving surface, a plurality of different radii of curvature may be achieved.

Figure 7:
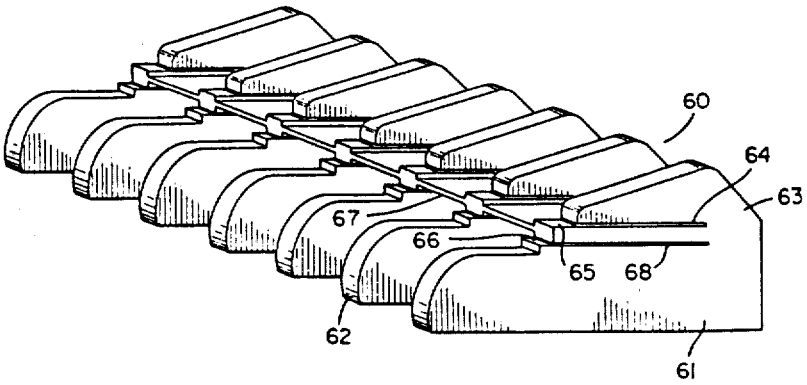
FIG. 7 is a perspective view of another embodiment of the present invention.

FIG. 7 shows an alternate embodiment of applicants' novel concept. Here the entire blade assembly, absent the razor blades, of course, is molded as a single integral piece, i.e., seat 61, guard bar 62 and cap 63 are integrally formed of a flexible polymeric material. The construction consists of a series of ribbed structures joined by thin flexible webs 67. Slots 65 and 66 are formed one below the other respectively in each rib section of cartridge 60 and the second and first blades are disposed in such slots. The blades may be movably pinned or adhesively bonded to the slots to achieve flexibility and may be arranged to conform to the shaving geometry heretofore set forth. The same alternative configuration may be utilized in a single blade design by the elimination of one of the blade slots and a commensurate decrease in the vertical dimension of the cartridge.

Applicants have produced a flexible shaving assembly capable of conforming to the varying contours of the shaving surface with minimal variations in shaving geometry. The novel cartridge achieves a dynamic flexibility through a range of different positions and forces applied by the user during the act of shaving. It enables the cutting edge to contact an increased skin surface, thereby producing enhanced shaving efficiency without degradation in performance or comfort. The applicants' invention may be applied to a wide range of varying cartridge designs, for example, the guard bar may be incorporated directly on the blade edge by the encompassing of such edge by a wire spirally wound about the blade or the placement of projections along the blade edge; these variations, as well as other modifications which may become evident to one of ordinary skill in the art, are considered to be within the scope and ambit of applicants' invention. The foregoing description and drawings are intended to be illustrative of applicants' invention and not in any way delimiting of its scope.

What is claimed is:

1. A razor assembly comprising a blade assembly including a seat member and a blade disposed thereon, the seat and blade being bonded together and flexible about an axis substantially parallel to the plane of the blade and perpendicular to its cutting edge, a razor handle for holding the blade assembly, and coupling means for connecting the blade assembly to the razor handle and permitting the blade assembly to flex [in both convex and concave directions] *selectively in the convex or concave mode* in response to shaving forces.

2. The blade assembly of claim 1 comprising a seat member having a surface of substantially planar form, a blade having a sharpened cutting edge disposed on the surface, a cap member on the blade having a forward margin located rearwardly of the cutting edge, and a guard member located forwardly of the cutting edge, the seat, blade, cap and guard member being yieldingly bonded together and flexible about an axis parallel to the plane of the blade and perpendicular to the cutting edge.

3. A razor assembly comprising:

a seat member having a substantially planar surface and a guard bar member integrally formed transversely along its forward margin, the guard and seat members formed of a flexible material;

a flexible blade member having a sharpened edge along a transverse margin disposed on the planar surface with its edge parallel to and rearwardly located of the guard bar member;

a cap member of flexible material having a substantially planar surface in contact with the blade and a front margin located rearwardly of the cutting edge, the seat, blade and cap members being yieldingly bonded together to form a blade assembly flexible about an axis substantially parallel to the plane of the blade and perpendicular to the cutting edge;

a razor handle for holding the blade assembly; and pivot means for connecting the blade assembly to the razor handle and for [convex and concave] flexing of the blade assembly *selectively in the convex or concave mode* in response to shaving forces.

4. The assembly of claim 3 wherein the pivot means includes linkage means.

5. The assembly of claim 3 wherein the pivot means includes two pins projecting outwardly of the coupling means coaxially aligned and in registration with a first channel and a second channel in the seat member, respectively, the first and second channels being in a plane parallel to the plane of the blade and perpendicular to the cutting edge.

6. The assembly of claim 5 wherein the seat member comprises a series of rib members interconnected by webs, and arrayed orthogonally to the front margin of the seat member.

7. The assembly of claim 6 wherein the guard bar member is a comb guard bar, the teeth of which are formed by forwardly extending portions of the rib members.

8. The assembly of claim 7 wherein the teeth of the comb guard bar member have a pitch dimension greater than approximately 0.090 inch and less than approximately 0.200 inch and the interconnecting web has a thickness greater than approximately 0.010 and less than approximately 0.030 inch.

9. The assembly of claim 8 wherein each tooth of the comb guard bar assembly has a width approximately greater than 25% and less than approximately 75% of the pitch dimension.

10. The assembly of claim 5 wherein the first and second channels have a center-to-center spacing greater than 40%.

11. The assembly of claim 10 wherein the first and second channels have center-to-center spacing less than 75% of the transverse length of the seat member, and the first channel has a transverse dimension greater than the transverse dimension of the pin in registration therewith so as to allow the pin to move transversely within the first channel during flexure of the assembly.

12. The assembly of claim 11 wherein the seat, guard bar and cap members are molded from a flexible polymeric material selected from the group consisting of polyvinyl chloride, polyethylene, ethylene vinyl acetate, silicone, urethane and thermoplastic rubbers.

13. The assembly of claim 12 wherein the assembly is yieldingly bonded with adhesives selected from the group consisting of acrylics, rubbers, silicones, and synthetics.

14. The assembly of claim 13 comprising a second blade disposed parallel to and rearwardly of the blade, and interposed between the blade and the cap member.

15. The assembly of claim 14 wherein the second blade is yieldingly bonded.

16. The assembly of claim 15 wherein the members are bonded by adhesive strips interposed between each of the members, and the assembly includes a spacer member interposed between the blade and the second blade.

17. The assembly of claim 16 wherein the substantially planar surface of the cap member is in contact with the adhesive strip engaging the second blade, the blade seat has a transversely extending rear margin perpendicular to the axes of the first and second channels which extend therethrough, the coupling means has a substantially planar surface from which pivot pins extend, which surface abuts and is parallel to the rear margin.

18. The assembly of claim 17 wherein the pivot pins have expanded heads on their distal ends, the first and second channels terminate in a plenum formed in the blade seat into which plenum the expanded heads of the pivot pins extend when the pivot pins are in registration with the first and second channels.

19. The assembly of claim 18 wherein the seat member comprises a series of rib members interconnected by webs, and arrayed orthogonally to the front margin of the seat member, and the first and second channels are contained in first and second ribs respectively of increased transverse dimension.

20. The assembly of claim 19 wherein the plenum is extended to form bifurcated members on both the first and second ribs, the bifurcated members extending to form teeth of the comb guard.

21. The assembly of claim 20 wherein projections are included at each end of the guard bar member to mask the blade edges.

22. The assembly of claim 3 having a shaving geometry as follows: tangent angle between approximately 15° and 40°; exposure between approximately −0.010 inch and +0.006 inch; span between approximately 0.030 and 0.080 inch.

23. The assembly of claim 22 wherein the tangent angle is approximately 20° to 24°, the exposure is approximately −0.004 to +0.002 inch, and the span is approximately 0.045 to 0.070 inch.

24. The assembly of claim 23 comprising a second blade disposed parallel to and rearwardly of the blade and interposed between the blade and the cap member, and wherein the shaving geometries of the blade and the second blade are as follows: tangent angle between approximately 15° and 40°; exposure between approximately −0.010 inch and +0.006 inch; span between approximately 0.030 and 0.080 inch.

25. The assembly of claim 24 wherein the blade and the second blade have a tangent angle of approximately 20° to 24°, exposure of approximately −0.010 to +0.006 inch, and span of approximately 0.045 to 0.070 inch.

26. The assembly of claim 25 wherein the tangent angle of the second blade is less than the tangent angle of the blade.

27. The assembly of claim 7 wherein the assembly is integrally molded from a flexible material.

28. The assembly of claim 27 wherein the blade is movably attached to the molded assembly.

29. The assembly of claim 28 comprising a second blade movably attached to a second complementary slot in the assembly and disposed parallel to and rearwardly of the blade, and interposed between the blade and the cap member of the assembly.

30. The assembly of claim 29 wherein the blades are adhesively bonded.

* * * * *